(12) United States Patent
Petrucci et al.

(10) Patent No.: US 9,621,952 B2
(45) Date of Patent: Apr. 11, 2017

(54) VIDEO DISPLAY MONITORING METHODS AND SYSTEMS

(71) Applicant: GM GLOBAL TECHNOLOGY OPERATIONS LLC, Detroit, MI (US)

(72) Inventors: David R. Petrucci, Warren, MI (US); Douglas C. Martin, Oxford, MI (US); Charles A. Massoll, Milford, MI (US)

(73) Assignee: GM GLOBAL TECHNOLOGY OPERATIONS LLP, Detroit, MI (US)

( * ) Notice: Subject to any disclaimer, the term of this patent is extended or adjusted under 35 U.S.C. 154(b) by 44 days.

(21) Appl. No.: 13/868,718

(22) Filed: Apr. 23, 2013

(65) Prior Publication Data

US 2014/0317648 A1    Oct. 23, 2014

(51) Int. Cl.
| H04H 60/32 | (2008.01) |
| H04N 21/454 | (2011.01) |
| H04N 21/414 | (2011.01) |
| H04N 21/44 | (2011.01) |

(52) U.S. Cl.
CPC ..... H04N 21/454 (2013.01); H04N 21/41422 (2013.01); H04N 21/44008 (2013.01)

(58) Field of Classification Search
CPC ... H04N 21/44222; H04H 60/43; H04H 60/33
See application file for complete search history.

(56) References Cited

U.S. PATENT DOCUMENTS

| 2004/0093299 A1* | 5/2004 | Bodin ............... G06Q 30/02 |
| | | 705/37 |
| 2008/0032685 A1* | 2/2008 | Talty et al. ............. 455/422.1 |
| 2011/0021234 A1* | 1/2011 | Tibbitts et al. .......... 455/517 |
| 2011/0276224 A1* | 11/2011 | Pair et al. ................ 701/36 |
| 2012/0242474 A1* | 9/2012 | Oh ................. G01C 21/3688 |
| | | 340/441 |
| 2013/0058529 A1* | 3/2013 | Levin ................. A61B 3/113 |
| | | 382/103 |
| 2013/0279308 A1* | 10/2013 | Helm et al. ................ 369/7 |
| 2015/0258996 A1* | 9/2015 | Victor ................ G09B 19/16 |
| | | 340/576 |

* cited by examiner

Primary Examiner — Nathan Flynn
Assistant Examiner — Alfonso Castro
(74) Attorney, Agent, or Firm — Lorenz & Kopf, LLP

(57) ABSTRACT

Methods and apparatus are provided for monitoring video content provided to a vehicle. In one embodiment a method includes: receiving video content at the vehicle; monitoring the video content based on guidelines data stored in a datastore; and selectively modifying the video content based on the monitoring.

22 Claims, 3 Drawing Sheets

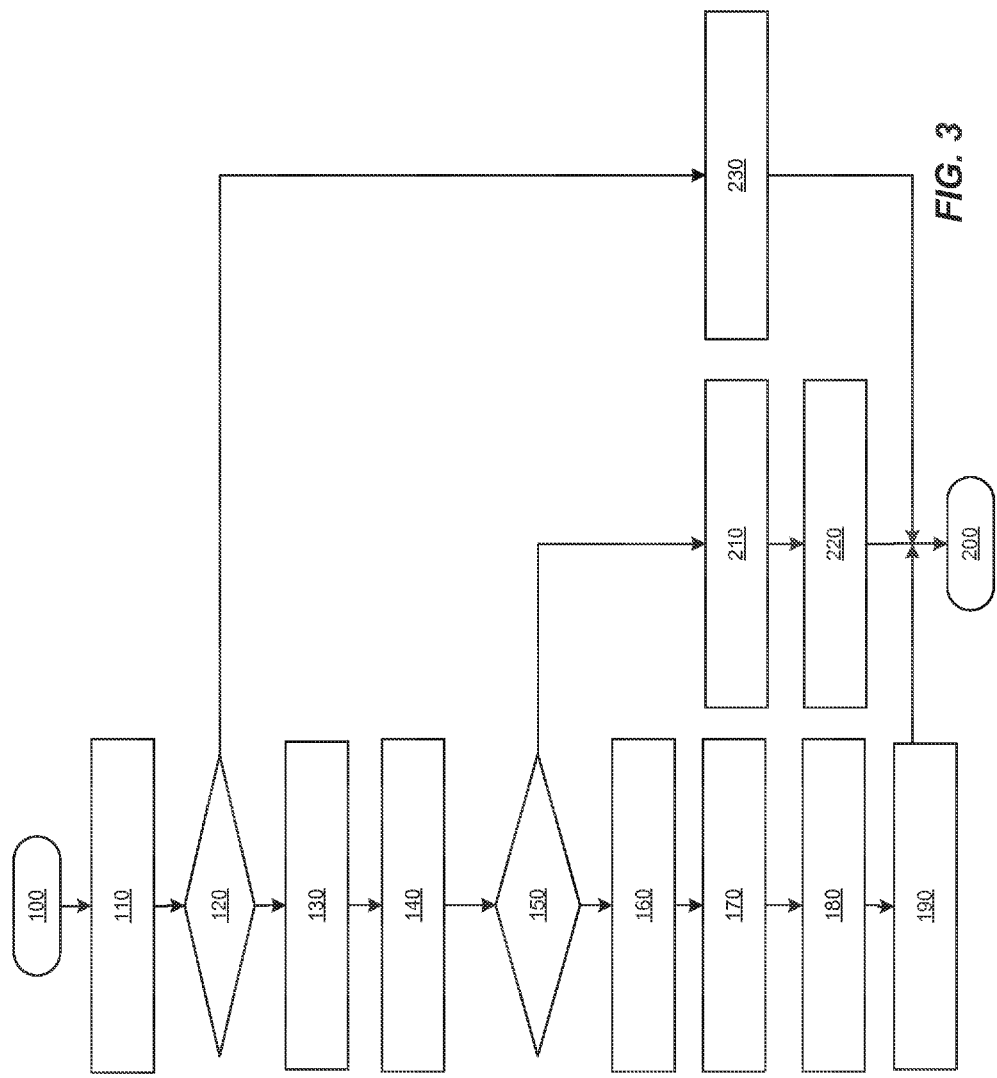

VIDEO DISPLAY MONITORING METHODS AND SYSTEMS

TECHNICAL FIELD

The technical field generally relates to methods and systems for monitoring a video display, and more particularly relates to methods and systems for monitoring video signals to be displayed by a video display in a vehicle.

BACKGROUND

Guidelines have been established to regulate how and when video content is displayed on a display associated with a human vehicle interface (HVI) of a vehicle. These guidelines take in to consideration the various driving conditions and environments the driver may encounter when operation the vehicle. Any video content that is displayed on the display of the HVI must comply with these guidelines.

In some cases, video content may be supplied to the HVI from a source other than the vehicle. For example, applications from a Smartphone or an external navigation system may communicate with the HVI to display their video content. These applications must be certified before their video content is displayed to ensure they meet the guidelines. In some cases, the video content is modified after the certification process and thus, may not meet the guidelines.

Accordingly, it is desirable to provide methods and systems for monitoring the video content. In addition, it is desirable to provide methods and systems that perform corrective actions when the video content does not meet the guidelines. Furthermore, other desirable features and characteristics of the present disclosure will become apparent from the subsequent detailed description and the appended claims, taken in conjunction with the accompanying drawings and the foregoing technical field and background.

SUMMARY

Methods and apparatus are provided for monitoring video content provided to a vehicle. In one embodiment a method includes: receiving video content at the vehicle; monitoring the video content based on guidelines data stored in a datastore; and selectively modifying the video content based on the monitoring.

In another example, a system includes a first module that receives the video content at the vehicle. A second module monitors the video content based on guidelines data stored in a datastore. A third module selectively modifies the video content based on the monitoring.

DESCRIPTION OF THE DRAWINGS

The exemplary embodiments will hereinafter be described in conjunction with the following drawing figures, wherein like numerals denote like elements, and wherein:

FIG. 3 is a flowchart illustrating a video monitoring method that may be performed by a video monitoring system in accordance with various exemplary embodiments.

DETAILED DESCRIPTION

Figure 1:
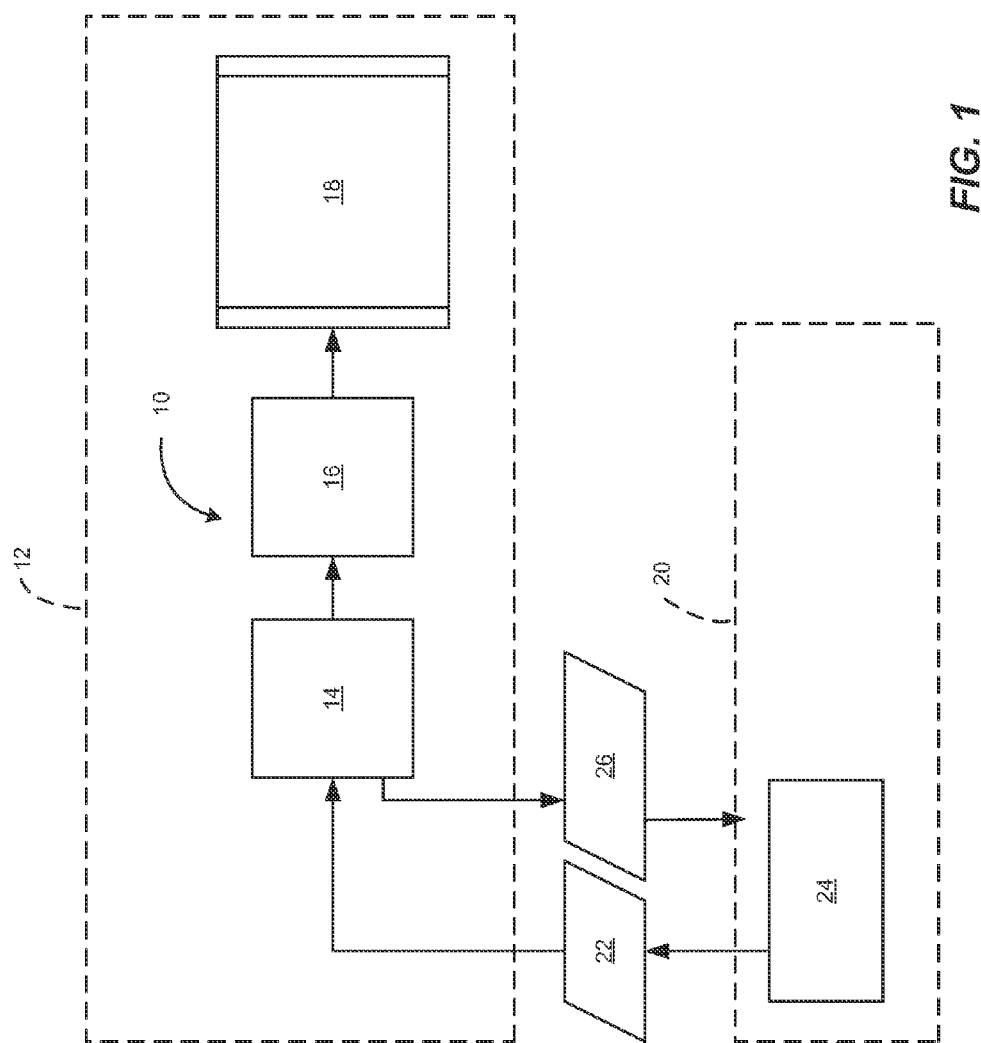
FIG. 1 is a functional block diagram illustrating a vehicle that includes a video monitoring system that is associated with a human vehicle interface in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 is shown to include a video monitoring system 12 in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

The video monitoring system 12 generally includes a human vehicle interface (HVI) module 14, and a video monitoring module 16 that communicates with a display device 18. In various embodiments, the HVI module 14 communicates directly or indirectly with a device that is foreign or not a part of the vehicle 10 (hereinafter referred to as a foreign device 20). The foreign device 20 can include, for example, but is not limited to, a Smartphone, a navigation system (e.g., a GPS device), or any other device that is capable of communicating with the vehicle 10 according to any wired or wireless communication protocol.

The HVI module 14 receives video content 22 from an application 24 of the foreign device 20. The application 24 can be any software application that generates any type of video content 22 for display. The video content 22 is typically displayed on a display (not shown) of the foreign device 20, however in this example the video content 22 is being sent to the vehicle 10 to be displayed by the display device 18.

Upon receipt of the video content 22, the HVI module 14 provides the video content 22 to the video monitoring module 16 for monitoring. The video monitoring module 16 monitors the video content 22 based on pre-established guidelines. The pre-established guidelines may include rules or data values in which the video content 22 must comply in order to be displayed on the display device 18 of the vehicle 10. For example, the guidelines may be established by a governmental entity or by the vehicle manufacturer and may indicate a certain rate of change of the video content 22, a certain rapid or repeated change in the video stream (i.e., the entire video stream), or a certain area of flashing (e.g., on/off, or red to white to red to white, etc.) In various embodiments, the guidelines may be established for certain types of video content 22, for certain types of foreign devices 20, and/or for certain jurisdictions in which the vehicle 10 is driving.

The video monitoring module 16 modifies the video content 22 before it is displayed by the display device 18 when the video content 22 does not meet the guidelines. For example, the video monitoring module 16 may modify the video content 22 by causing all or a portion of the video content 22 to be blocked from being displayed (e.g., by modified display signals) when the video content 22 does not meet the guidelines. The video monitoring module 16 leaves the video content 22 unmodified when the video content 22 does meet the guidelines. For example, the video monitoring module 16 sends the video content 22 to the display device 18 (e.g., by display signals) when the video content 22 meets the guidelines.

In various embodiments, the video monitoring module 16 further tracks whether video content 22 meets the guidelines and provides notifications of monitoring results 26 to the foreign device 20 and/or other devices or interested systems based on the tracking. These monitoring results 26 may be used by a developer of the application 24 to modify the application 24 such that the video content 22 meets the required guidelines.

Figure 2:
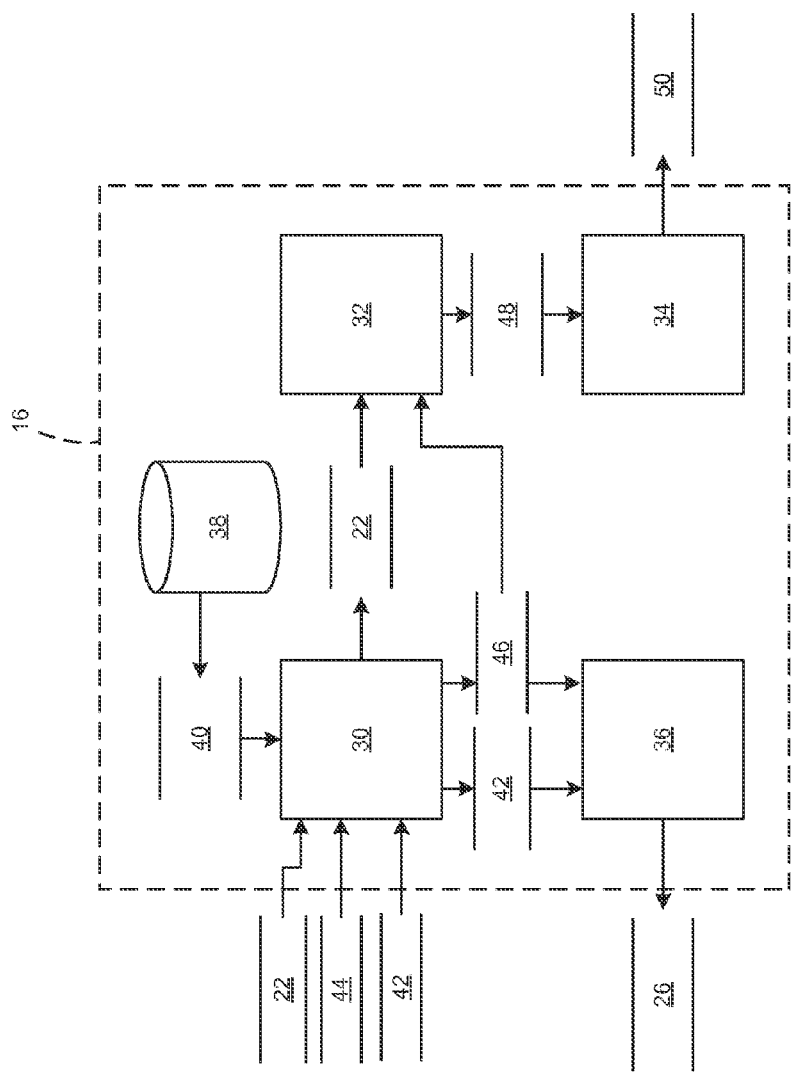
FIG. 2 is a dataflow diagram illustrating a video monitoring module of the video monitoring system in accordance with various exemplary embodiments.

Referring now to FIG. 2, a dataflow diagram illustrates various embodiments of the video monitoring module 16. Various embodiments of the video monitoring module 16 according to the present disclosure may include any number of sub-modules. As can be appreciated, the sub-modules shown in FIG. 2 may be combined and/or further partitioned to similarly monitor the video content 22 being supplied to the HVI module 14 and to take corrective actions when the video content 22 does not meet particular guidelines. Inputs to the video monitoring module 16 may be received from the foreign device 20 (FIG. 1), received from other modules (not shown) of the vehicle 10 (FIG. 1), and/or determined by other sub-modules (not shown) of the video monitoring module 16. In various embodiments, the video monitoring module 16 includes a monitoring module 30, a content manager module 32, a display manager module 34, a verification module 36, and a guidelines datastore 38.

The guidelines datastore 38 stores threshold data and/or rule information 40 associated with the guidelines. The threshold data and/or rule information 40 can be pre-configured based on the guidelines and/or can be updated as the guidelines change. In one example, the threshold data and/or rule information 40 can includes rate of change thresholds that pertain to certain types of video content 22, video content sources, and/or jurisdictions. For exemplary purposes, the remainder of the disclosure will be discussed in the context of the guidelines pertaining to these rate of change thresholds.

The monitoring module 30 receives as input the video content 22, video data 42, and vehicle data 44. The video content 22 may be in the form of a video signal that is received from the HVI module 14 (FIG. 1). The video data includes, but is not limited to, a source (e.g., an indication of where the signal is coming from), a type (e.g., an indication of what type of video content is included in the signal), and a certification of the video signal (e.g., an indication that the video content has or has not been certified). As can be appreciated, the video data can be received as part of the video signal or as separate data. The vehicle data includes data that indicates current operational status of the vehicle 10 (FIG. 1) (e.g., a speed of the vehicle, a PRNDL position such as park, reverse, drive, or neutral of the vehicle, etc.) and location of the vehicle 10 (FIG. 1) (e.g., geographic coordinates indicating a country, a state, a city, etc.).

Based on the video data 42 and/or the vehicle data 44, the monitoring module 30 accesses the threshold data or rule information 40 from the guidelines datastore 38 for evaluating the video content 22 of the video signal. For example, if vehicle data 44 indicates that the vehicle 10 (FIG. 1) is operating in a certain jurisdiction (e.g., in the United States) then a first set of threshold data (e.g., stored in one or more tables associated with the United States) is selected from the guidelines datastore 38. If the vehicle data 44 indicates that the vehicle 10 (FIG. 1) is operating under certain vehicle speeds, then a sub-set of threshold data (e.g., one or more tables associated with vehicles speeds between zero and twenty-five miles per hour) is selected from the first set of threshold data. If the video data 42 indicates that the video signal is from a particular source, then a third sub-set of threshold data (e.g., one or more tables for a MirrorLink source) is selected from the guidelines datastore 38. As can be appreciated, the monitoring module may evaluate the vehicle data 44 and the video data 42 in any order and is thus not limited to the present example.

The monitoring module 30 continues the process of evaluating the vehicle data 44 and the video data 42 until a single threshold is obtained from the threshold data. In various embodiments, the monitoring module 30 determines a rate of change of the video content in the video signal and compares the determined rate of change with the threshold. For example, the monitoring module 30 determines the rate of change by processing motion vectors of the video data 42. For example, distance measurements can be processed (e.g., summed, averaged, etc.) to provide an amount of motion.

If the rate of change exceeds the threshold, then the monitoring module 30 sets a content status 46 to indicate that all or part of the video content 22 violates the guidelines as indicated by the threshold and that the video content 22 should be blocked. If the rate of change is less than the threshold, then the monitoring module 30 sets the content status 46 to indicate that the video content 22 does not violate the guidelines as indicated by the threshold and that the video content 22 should not be blocked.

The content manager module 32 receives as input the video content 22 from the video signal and the content status 46. Based on the content status 46, the content manager module 32 selectively modifies or does not modify the video content 22 such that the content is "blocked" from being displayed or is fully displayed and provides monitored video content 48 to the display manager module 34 based thereon.

For example, when the content status 46 indicates that the video content 22 does not violate the guidelines, the video content 22 provided to the display manger module 34 unmodified. In another example, when the content status 46 indicates that all or part of the video content 22 violates the guidelines, then the content manager module 32 modifies the portion of the video content 22 that was indicated as violating the guidelines such that the display of which does not distract a driver of the vehicle 10 (FIG. 1). For example, the video content 22 can be modified (or otherwise replaced) in a number of ways, including, but not limited to, in a way such that the content displays all one color on the display device 18, such that the video content 22 displays a hash or other pattern on the display device 18, or such that the video content 22 appears frozen (e.g., the video content 22 is set to the video content of a previous frame). The content manager module 32 blocks the video content 22 from being displayed until the content status 46 indicates that the video content 22 no longer violates the guidelines.

The display manager module 34 receives as input the monitored video content 48 that is either modified or unmodified. The display manager module 34 generates display signals 50 to the display device 18 (FIG. 1) to display the video content 22 either in the modified or blocked form or the unmodified or unblocked form.

The verification module 36 receives as input the video data 42, and the content status 46. Based on the video data 42 and the content status 46, the verification module 36 tracks and verifies the video content 22. For example, the verification module 36 tracks the content status 46 of the video content 22 for the particular device or application source based on one or more predefined verification metrics. The verification module 36 generates the monitoring results 26 based on the tracking. For example, if the content status 46 does not meet the verification metrics, the verification module 36 generates monitoring results 26 that indicate that the video content 22 does not meet requirements and the application 24 that produced the video content 22 must be reworked. In another example, if the content status 46 does meet the verification metrics, the verification module 36 generates monitoring results 26 that indicate that the video content 22 has been verified and that no rework is necessary.

Referring now to FIG. 3, and with continued reference to FIGS. 1 and 2, a flowchart illustrates a video monitoring method that can be performed by the video monitoring system 10 of FIG. 1 in accordance with various embodiments. As can be appreciated in light of the disclosure, the order operation within the method is not limited to the sequential execution as illustrated in FIG. 3, but may be performed in one or more varying orders as applicable and in accordance with the present disclosure.

As can further be appreciated, the method of FIG. 3 may be scheduled to run at predetermined time intervals during operation of the vehicle 10 or the HVI module 14 and/or may be scheduled to run based on predetermined events.

In one example, the method may begin at 100. The video content 22 is received at 110. The video data 42 is evaluated to determine if it is from a foreign device 20 at 120. If the video content 22 is from a foreign device 20 at 120, the threshold data and/or rule information 40 are obtained from the guidelines datastore 38 based on the video data 42 and/or the vehicle data 44 at 130. The metrics for evaluating the video content 22 are determined at 140 and compared to the threshold data and/or rule information 40 at 150. For example, the rate of change of the video content 22 is determined at 140. The determined rate of change is then compared to the threshold data at 150. If the rate of change exceeds the threshold data at 150, the video content is modified at 160 and the modified video content is displayed such that all or part of the video content 22 is blocked at 170. Thereafter, the content status is tracked at 180, the monitoring results 26 are generated based on the content status at 190, and the method may end at 200.

If, however, at 150 the rate of change of the video content 22 does not exceed the threshold data, the video content is not modified rather the unmodified video content is displayed by the display device 18 at 210. Thereafter, the monitoring results 26 are generated based on the content status at 220, and the method may end at 200.

If, however, at 120, the video content 22 is not from a foreign device 20, the video content is displayed by the display device 18 at 230 and the method may end at 200. As can be appreciated, the flow of steps 120 and 230 is merely exemplary as the video content 22 from non-foreign sources may similarly be evaluated according to steps 130-220.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of monitoring video content provided to a vehicle, comprising:
    receiving the video content at the vehicle;
    monitoring, by a processor of the vehicle, the video content in real-time based on guidelines data stored in a datastore of the vehicle, the guidelines data indicating rules and data values established by a government entity in which the video content must comply in order to be displayed in the vehicle; and
    selectively modifying, by a processor of the vehicle, display characteristics of the video content in real-time based on the monitoring, wherein the selectively modifying comprises blocking selected data of a frame of the video content from being displayed by at least one of freezing and defining a constant value for the selected data of the frame of the video content.

2. The method of claim 1, wherein the selectively modifying the video content comprises modifying the video content such that all of the video content is blocked from being displayed when all of the video content violates the guidelines data.

3. The method of claim 1, wherein the selectively modifying the video content comprises modifying the video content such that a portion of the video content is blocked from being displayed when the portion of the video content violates the guidelines data.

4. The method of claim 1, wherein the selectively modifying comprises modifying the video content such that the video content is blocked from being displayed.

5. The method of claim 4, wherein the selectively modifying comprises modifying the video content to display all one color.

6. The method of claim 4, wherein the selectively modifying comprises modifying the video content to display a pattern.

7. The method of claim 4, wherein the selectively modifying comprises modifying the video content to display a selected frame of video content.

8. The method of claim 1, wherein the guidelines data is pre-stored based on a vehicle data.

9. The method of claim 1, wherein the guidelines data is pre-stored based on video data.

10. The method of claim 1, further comprising displaying the modified video content on a display device of the vehicle.

11. The method of claim 1, wherein the receiving the video content is from a foreign device of the vehicle.

12. The method of claim 1, further comprising generating monitoring results based on the monitoring.

13. A system for monitoring video content provided to a vehicle, comprising:
    a first module that receives the video content at the vehicle;
    a second module that, by a processor, monitors the video content in real-time based on guidelines data stored in a datastore of the vehicle, the guidelines data indicates rules and data values established by a government entity in which the video content must comply in order to be displayed in the vehicle; and a third module that, by a processor, selectively modifies display characteristics of the video content in real-time based on the monitoring wherein the selectively modifying comprises blocking selected data of a frame of the video content from being displayed by at least one of freezing and defining a constant value for the selected data of the frame of the video content.

14. The system of claim 13, wherein the third module selectively modifies the video content such that all of the video content is blocked from being displayed when all of the video content violates the guidelines data.

15. The system of claim 13, wherein the third module selectively modifies the video content such that the portion of the video content is blocked from being displayed when a portion of the video content violates the guidelines data.

16. The system of claim 13, wherein the third module selectively modifies the video content such that the video content is blocked from being displayed.

17. The system of claim 16, wherein the third module selectively modifies the video content to display all one color.

18. The system of claim 16, wherein the third module selectively modifies the video content to display a pattern.

19. The system of claim 16, wherein the third module selectively modifies the video content to display a selected frame of video content.

20. The system of claim 13, wherein the guidelines data is pre-stored based on at least one of vehicle data and video data.

21. The system of claim 13, further comprising a fourth module that displays the modified video content on a display device of the vehicle.

22. The system of claim 13, further comprising a fifth module that generates monitoring results based on the monitoring.

* * * * *